United States Patent [19]
Lotfi

[11] Patent Number: 6,086,297
[45] Date of Patent: Jul. 11, 2000

[54] APPARATUS FOR FORMING GROOVES IN BELL-SHAPED PIPES

[75] Inventor: Ray Lotfi, Collegeville, Pa.

[73] Assignee: CertainTeed Corporation, Valley Forge, Pa.

[21] Appl. No.: 09/160,026

[22] Filed: Sep. 24, 1998

[51] Int. Cl.$^7$ ........................................ B23C 3/28
[52] U.S. Cl. ........................................ 409/184; 409/197
[58] Field of Search ........................ 409/66, 74, 184, 409/189, 197, 194, 187

[56] References Cited

U.S. PATENT DOCUMENTS

| | | | |
|---|---|---|---|
| 2,268,078 | 12/1941 | McCurdy | 409/74 |
| 3,668,971 | 6/1972 | Dever | 90/11 R |
| 3,985,051 | 10/1976 | Brown | 90/11 A |
| 4,091,514 | 5/1978 | Motes-conners et al. | 29/33 T |
| 4,383,395 | 5/1983 | Wilger et al. | 51/245 |
| 4,577,535 | 3/1986 | Klabunde et al. | 82/2 E |
| 4,758,121 | 7/1988 | Kwech | 409/185 |
| 4,778,316 | 10/1988 | Strait | 409/177 |
| 5,044,844 | 9/1991 | Backhouse | 409/178 |

*Primary Examiner*—Daniel W. Howell
*Attorney, Agent, or Firm*—Duane Morris & Heckscher LLP

[57] ABSTRACT

Equipment for machining a bell portion of plastic pipe. The equipment includes a device for clamping the pipe against movement, at least one rotary cutter for cutting at least one groove in the bell portion, and mechanisms for causing at least one rotary cutter to traverse the interior wall of the bell portion. The machining equipment further includes a drill for drilling a hole through the wall of the bell portion substantially tangentially to one of the annular grooves for receiving a flexible spline to interconnect the pipe with a correspondingly grooved second pipe to form a bell and spigot pipe connection.

18 Claims, 6 Drawing Sheets

APPARATUS FOR FORMING GROOVES IN BELL-SHAPED PIPES

CROSS REFERENCE TO RELATED APPLICATIONS

This application is related to pending U.S. Design application Ser. No. 29/084,031, filed on Feb. 23, 1998 and entitled "Restrained Bell and Spigot Fluid Pipe Connection," which is a continuation-in-part of pending U.S. application Ser. No. 08/944,113, filed on Oct. 6, 1997, and entitled "Anti-Rotation Pipe Joint," now U.S. Pat. No. 5,868,443 which, in turn, is a continuation of U.S. application Ser. No. 08/565,078, filed on Nov. 30, 1995, now abandoned, which applications are hereby incorporated by reference.

FIELD OF THE INVENTION

This invention relates to devices for machining pipes and, more particularly, to apparatus for providing circumferential grooves in fluid transport piping having bell-shaped portions.

BACKGROUND OF THE INVENTION

Pipe junction restrainers and techniques for their assembly have been developed to make fluid-tight connections between two axially-aligned pipes, joints, valves, fittings, hydrants, or other types of fluid connections. Often, these junction restrainers must withstand extraordinarily great pressures and tensile loads associated with water distribution and sewer connections.

It has been a current trend to employ polyvinyl chloride (PVC) plastic pipe in new construction. PVC pipes are often connected by a solvent weld or threaded joint. Solvent cement joints, while popular, release volatile gas and vapors which are unhealthy to workers and the environment. Glued joints also require substantial destruction of the coupling and piping in order to disassemble them. Threaded joints have been widely used on smaller pipe diameters in bell and spigot and same-diameter coupling designs. While threaded joints can be unscrewed, the task is usually time consuming and increases labor costs, especially if a PTFE tape or other sealant is used. Pipe-thread type joints are also easily distorted and damaged during pipe installation.

Newer systems have included a flexible spline as a restraining device. One popular system employed for connecting PVC pipe, sold under the trademark CERTA-LOK™ and produced by CertainTeed Corporation, Valley Forge, Pennsylvania, provides a restrained joint between a pair of pipe sections for municipal, fire protection, mining, irrigation, well casings, and other industrial uses. The CERTA-LOKT™ system forms a restraining mechanical lock that has a rating of about 150 psi and up. Since the restraining mechanism of the CERTA-LOK™ joint connector is uniformly distributed around the PVC pipes, the risk of damaging the plastic sidewalls by localized stress can be minimized. Similar connector designs are disclosed in French Pat. No. 1,397,378.

More specifically, the CERTA-LOK™ system provides a bell and spigot-type pipe connection for making a fluid connection between first and second pipes. This connection includes a first pipe having a first end, including a generally bell-shaped inner surface including a first annular recess or groove, and a second pipe having a second end sized to fit within a cavity defined by the generally bell-shaped inner surface of the first pipe. The second pipe includes a second annular recess or groove which can be aligned with the first annular recess of the bell-shaped inner surface of the first pipe to establish an annular cavity. The connection further includes an access hole disposed through a sidewall of the first end of the first pipe and communicating with the annular cavity. The flexible spline is inserted through this access hole and into the annular cavity for providing reversible restraint to the connection. Prior to insertion of the second pipe into the first pipe, an elastomeric fluid gasket is disposed between the bell-shaped inner surface of the first pipe and the outer surface of the second pipe, distally from the annular cavity, to provide a fluid-tight seal between the first and second pipes.

Bell and spigot type connections such as the CERTA-LOK™ system are lightweight and easy to handle, corrosion-resistant and easily reversible. Since no solvent cements are required, these connections are environmentally friendly and the connection joint achieves full strength immediately in all weather conditions. Bell and spigot-type connections also require no separate flanges, sleeves or tubular couplings.

Precise alignment and depth of the spline-receiving grooves of the first end second pipes of a bell and spigot pipe connection are essential for ensuring a proper connection between the pipe sections. If the grooves are slightly misaligned or if one or both of the grooves is of insufficient depth, the annular cavity formed thereby may be sufficiently occluded to hinder or perhaps prevent insertion of the spline into the cavity.

Because of the physical limitations of any plastic pipe fabrication process, virtually all plastic pipes are inherently lightly oblate or "out-of round". Moreover, the bell portions of such pipes vary considerably in wall thickness and diameter depending on the intended service application of the pipe.

These factors, as well as pipe length, render precise groove formation rather difficult. Consequently, existing machinery for groove cutting such as lathes, routers, and the like, which are suitable for cutting grooves in short length and virtually round pipes, have limited utility if used to form grooves of precise axial position and uniform depth in the internal wall surfaces of the bell portions of elongated plastic pipes.

An advantage exists, therefore, for an apparatus which is capable of forming annular grooves of precise position and depth in the interior wall of the bell portions of plastic pipes of varying sizes with minimal machinery adjustment being required as cut pipe is replaced in the machine by an uncut pipe.

SUMMARY OF THE INVENTION

The present invention provides an apparatus which is capable of forming annular grooves of precise position and depth in the interior wall of the bell portions of plastic pipes of varying sizes with minimal machinery adjustment being required as cut pipe is replaced in the machine by an uncut pipe. The apparatus is operable to machine pipes of varying lengths, diameters and wall thicknesses and can form at least one or, more preferably, two or more such grooves simultaneously. One groove is adapted to cooperate with a first corresponding groove provided in the outer wall of a pipe which is sized for insertion into the bell portion to establish an annular cavity between the two pipes. The annular cavity is sized to accommodate a flexible spline for mechanically connecting the pipes in a so-called bell and spigot pipe connection. Another groove is adapted to cooperate with a second corresponding groove provided in the outer wall of the inserted pipe of the bell and spigot connection to accommodate an o-ring for providing a liquid seal for the connection.

The pipe having the bell portion is fixed against rotation by external clamping means. Pilot means are adapted to seat against the inner surface of the tapered pipe section which serves as the transition between the nominal diameter portion of the pipe and the enlarged diameter bell portion. The length of the bell portion of a plastic pipe cannot be reliably controlled during the bell-forming process. Accordingly, as compared to the mouth of the bell portion, the tapered transition pipe section, whose axial position is fixed with respect to the nominal diameter portion of the pipe, serves as a reliable baseline for the axial positions of any annular grooves that may be cut in the bell portion. Hence, the groove cutting means are preferably disposed or indexed at fixed distances from the pilot means to ensure that the axial positions of the grooves cut thereby are accurate and predictable from one pipe to the next.

The groove cutting means preferably comprise rotatably driven cutting tool means which themselves are carried by a rotatable cutting frame. The cutting tool means score the interior wall of the bell portion while traveling therealong. Groove depth limiting means are preferably disposed closely adjacent the cutting tool means. The groove depth limiting means are adapted to contact the interior wall of the bell portion and limit the depth of cut of one or more of the grooves cut by the cutting tool means.

The apparatus further preferably includes means for continuously monitoring the groove depth limiting means to determine whether the groove depth limiting means remain in contact with the bell portion. The means for continuously monitoring are connected to automatic control means which continuously receive status signals from the means for continuously monitoring. Responsive to the received signals, the automatic control means transmit control signals to radial positioning means which may substantially instantaneously move the groove depth limiting means radially inwardly and outwardly to assure that the groove depth limiting means maintain constant contact with the interior wall of the bell portion and the cutting means maintain a uniform depth of cut in the bell portion.

The apparatus further preferably includes means for removing shavings from the interior of the bell portion that might interfere with the groove depth limiting means and, therefore, compromise the precision of the cutting process. In addition, the apparatus desirably includes means for cutting a substantially tangentially oriented hole in the circumferential wall of the bell portion in alignment with the spline groove for permitting the flexible spline to be inserted into and removed from the bell and spigot connection.

Other details, objects and advantages of the present invention will become apparent as the following description of the presently preferred embodiments and presently preferred methods of practicing the invention proceeds.

BRIEF DESCRIPTION OF THE DRAWINGS

The invention will become more readily apparent from the following description of preferred embodiments thereof shown, by way of example only, in the accompanying drawings wherein.

DETAILED DESCRIPTION OF THE INVENTION

Figure 1:
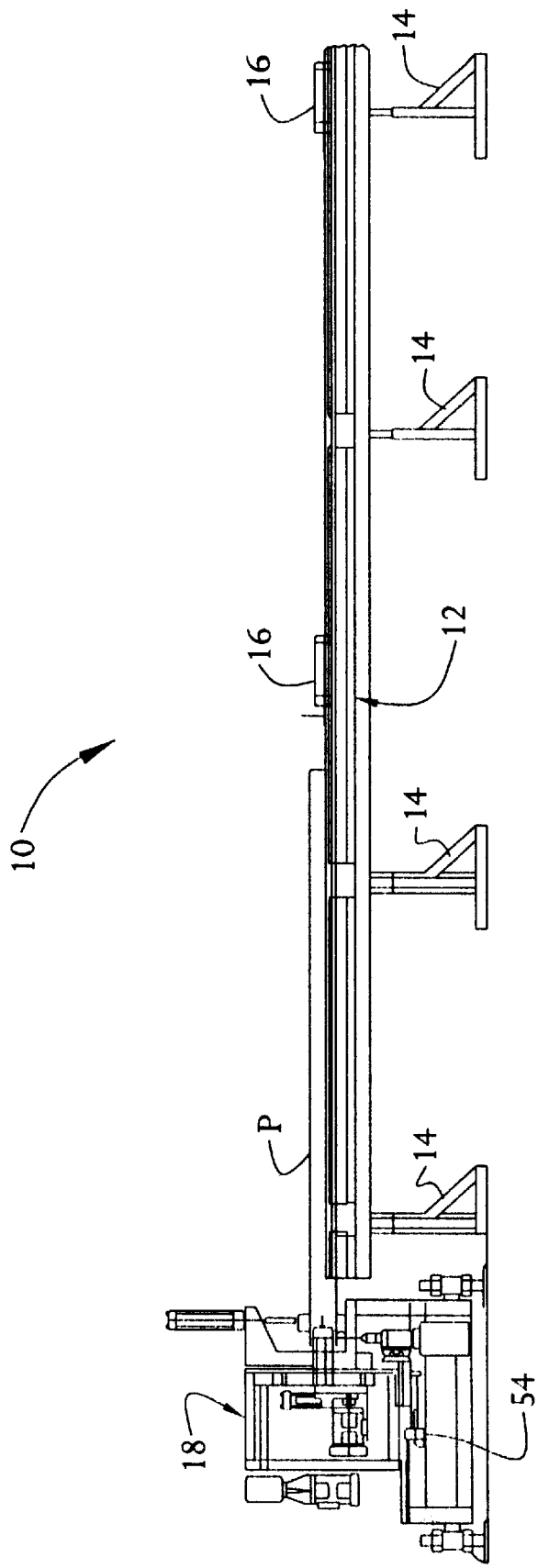
FIG. 1 is a side elevation view of a pipe machining apparatus constructed in accordance with the present invention.

Referring to FIG. 1 there is shown a side elevation view of a pipe grooving apparatus 10 according to the present invention. Apparatus 10 includes a table 12 supported by a plurality of stands 14 which include means for adjusting the height of table 12. The table is adapted to accommodate plastic pipes of several feet, and preferably up to about 20 feet, in length. In this regard, table 12 is preferably equipped with one or more push devices 16, such as hydraulic cylinders or the like, for feeding elongate plastic pipes P of desired length into the pipe grooving and clamping systems of apparatus 10 which are generally designated by reference numeral 18 and described in greater detail hereinbelow.

Figure 2:
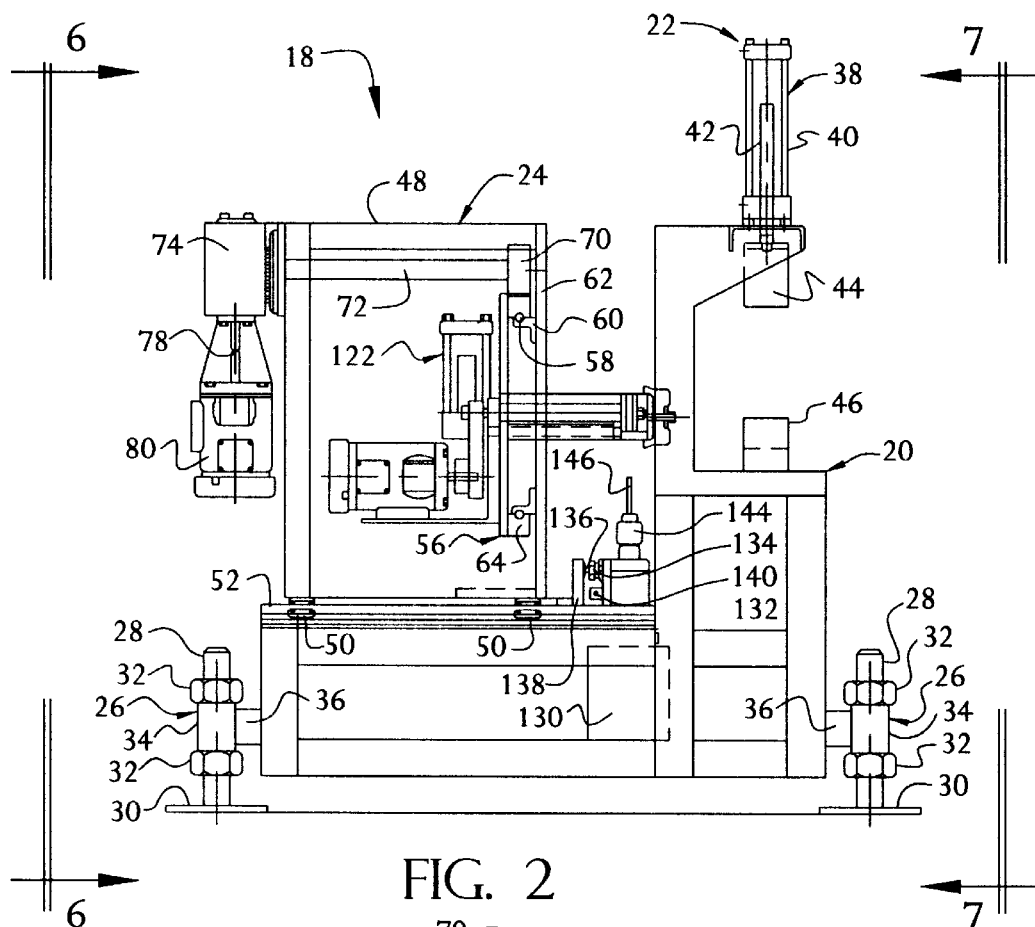
FIG. 2 is an enlarged view of the pipe machining and clamping systems of the apparatus of FIG. 1.
Figure 4:
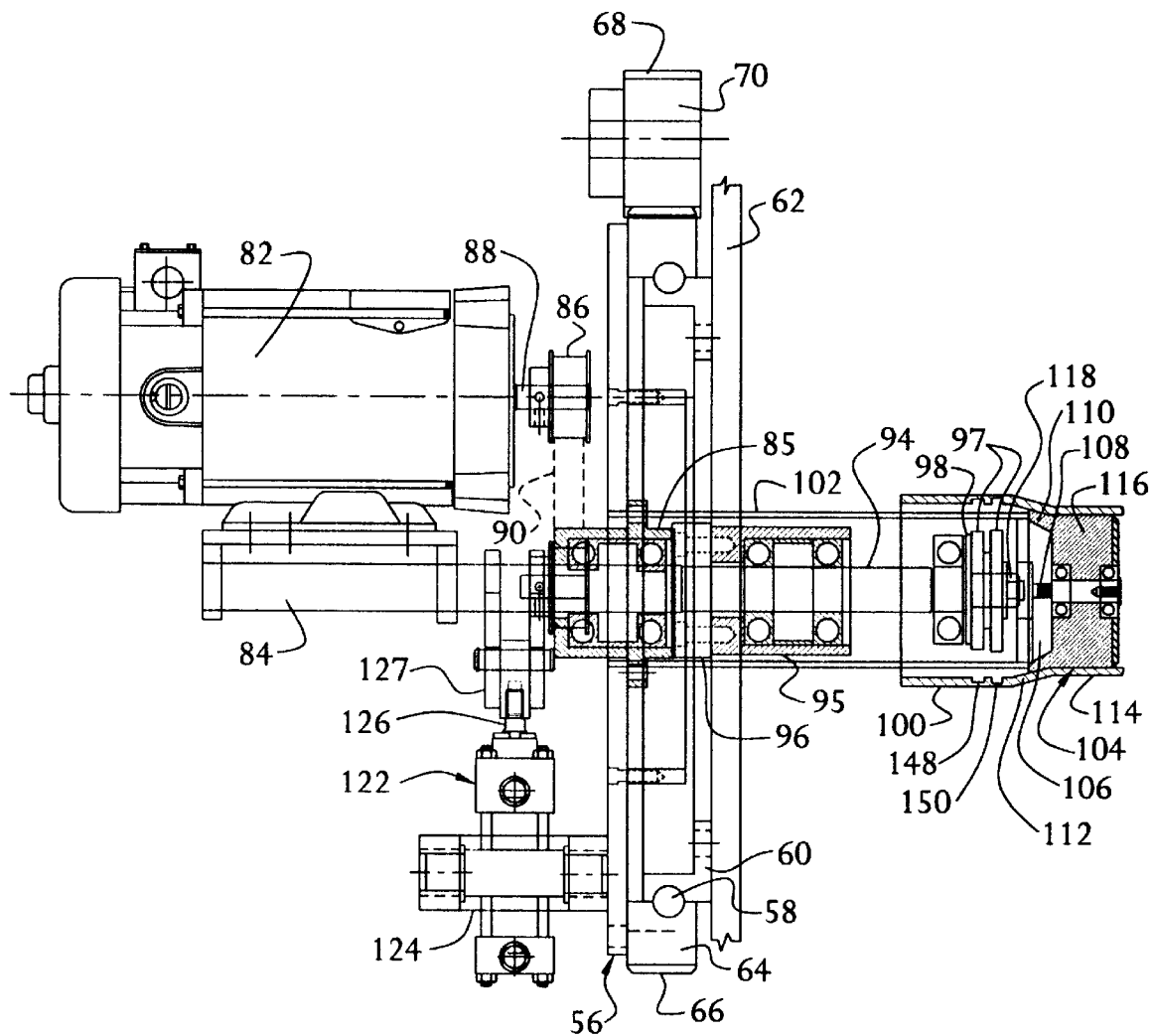
FIG. 4 is a further enlarged view of the pipe grooving equipment of FIG. 3.
Figure 5:
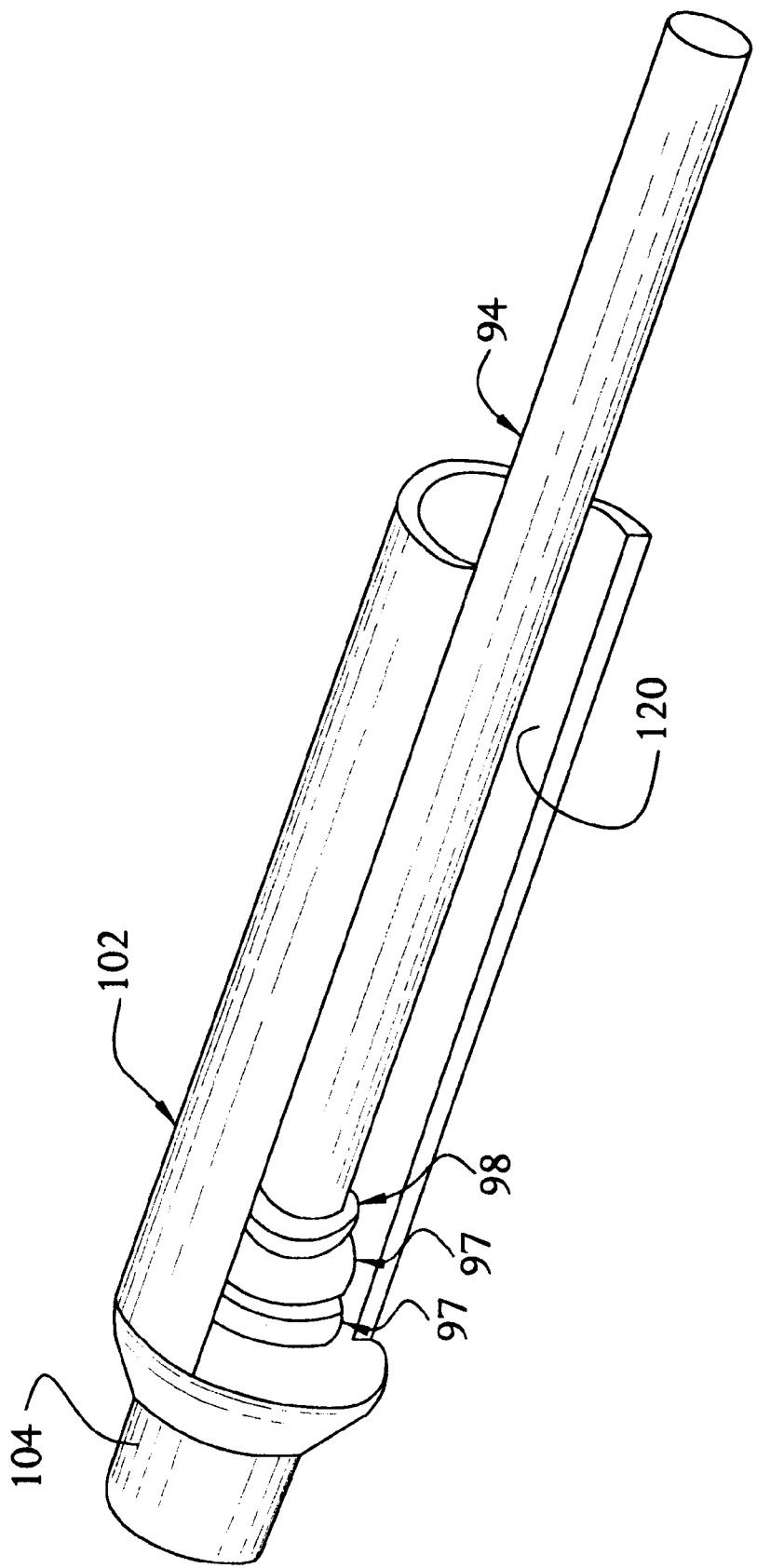
FIG. 5 is a partially cut perspective view of certain portions of the pipe grooving equipment of the present invention.
Figure 6:
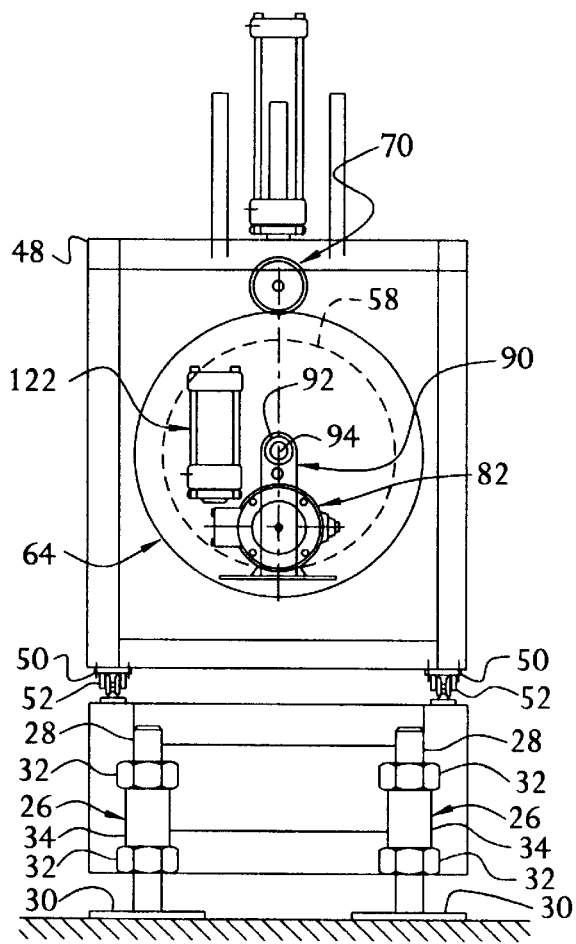
FIG. 6 is an elevational view taken along line 6—6 of FIG. 2 with certain elements omitted for clarity of illustration.
Figure 7:
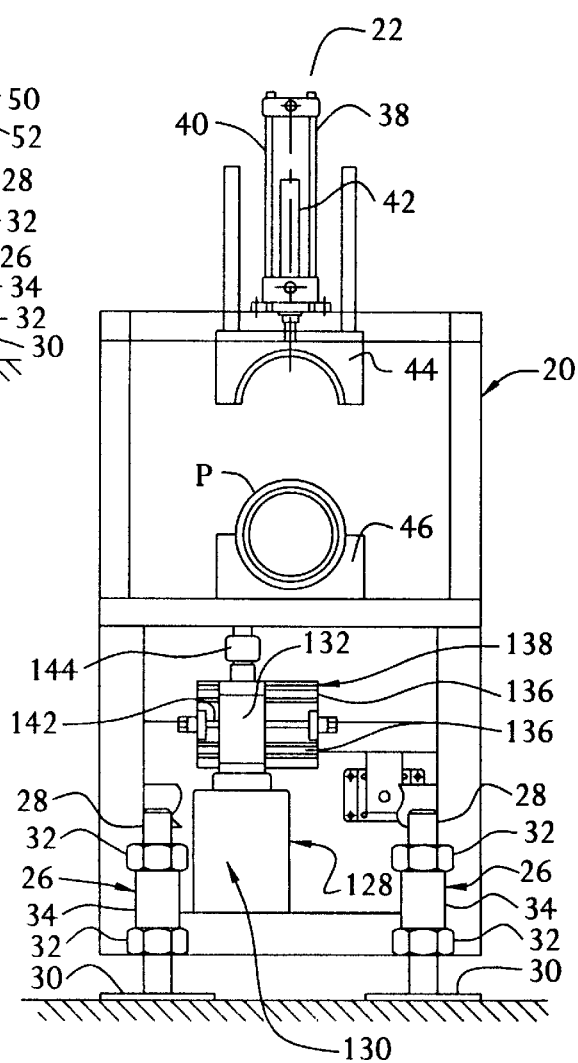
FIG. 7 is an elevational view taken along line 7—7 of FIG. 2 with certain elements omitted for clarity of illustration.

FIGS. 2 through 7 provide various views of the essential components of the pipe machining and clamping systems 18. FIGS. 2, 6, and 7 reveal that the pipe machining and clamping systems 18 are supported by a main frame 20 including pipe clamping means 22 and pipe machining means 24. The elevation of main frame 20 is preferably adjustable relative to table 12 via a plurality of vertical adjustment means 26 stationed about the lower periphery of the main frame. Vertical adjustment means 26 may comprise any suitable means for raising and lowering the main frame 20 including, without limitation, pneumatic or hydraulic cylinders, motorized screw jacks, and the like. According to a presently preferred construction, vertical adjustment means 26 comprise a plurality of heavy duty, upstanding, threaded metal rods 28 fixedly attached, such as by welding or the like, to bases 30. Vertical adjustment means 26 further include a pair of upper and lower nuts 32 which threadably engage with rods 27 and which are disposed on upper and lower ends of sleeves 34. The sleeves slidably receive rods 26 and are fixedly connected to main frame 20 via rigid plates 36. The various nuts 32 of each vertical adjustment means 26 are independently adjustable such that the main frame 20 may be selectively raised, lowered and leveled relative to table 12.

As perhaps most clearly depicted in FIGS. 2 and 7, pipe clamping means 22 preferably comprise a first extendable and retractable drive mean 38. Drive means 38 is constructed as a suitable fluid pressurized hydraulic or pneumatic piston and cylinder assembly or motorized screw jack. Preferably, drive means 38 is a pneumatic piston and cylinder assembly connected to an unillustrated supply of pressurized air such as a conventional compressor or the like. Drive means 38 preferably includes a single or double acting cylinder 40 which slidingly receives a piston 42. The lower end of cylinder 40 is attached to main frame 20. The end of piston 42 external of cylinder 40 carries a first jaw 44 which cooperates with a second jaw 46 affixed to main frame 46 to releasably grip plastic pipe P to prevent movement thereof, including rotation, during groove cutting of the bell portion of the pipe by pipe machining means 24.

As illustrated in FIGS. 2 and 6, pipe machining means 24 preferably comprises a first carriage 48 movably supported by main frame 20. More particularly, the first carriage 48 is preferably constructed as a sub-frame assembly the bottom of which includes a plurality of blocks 50 which slidably or rollingly engage with a pair of spaced apart rails 52 carried by main frame 20. First carriage 48 is translatable toward and away from plastic pipe P via a second extendable and retractable drive means 54 (FIG. 1). Drive means 54 may be any of the types discussed herein and has a first end affixed to main frame 20 and a second end affixed to first carriage 48 wherein one end of the drive means is stationary and the other is movable. Preferably, second drive means 54 is a single or double acting pneumatic cylinder and is also connected to the same supply of pressurized air as first drive means 38.

First carriage 48 carries an assortment of equipment which functions in concert to cut one or more grooves of precise depth and axial position in the interior wall of a bell portion of an elongate plastic pipe. Included among this equipment are means for drilling or boring a hole through the bell portion substantially tangentially to one of the grooves. The tangential hole is adapted to receive a flexible spline connector. The spline connector is removably insertable through the hole and into the associated groove as well as a corresponding groove provided in an outer wall of a pipe received in the bell portion to establish a reversibly interlocking bell and spigot pipe connection.

First carriage 48 carries a second carriage 56 which is rotatably connected to the first carriage via roller bearings 58. The roller bearings 58 are received in a raceway formed between an annular bracket 60 affixed to a first upright member 62 of the first carriage 48 and the inner circumferential wall of a ring gear 64 of the second carriage 56. As seen most clearly in FIG. 4, the outer circumferential wall of ring gear 64 includes teeth 66 which meshingly engage with the teeth 68 of a spur gear 70. Spur gear 70 is affixed the distal end of a shaft 72 which is rotatably driven by suitable gearing contained within a gear box 74 which is affixed to a second upright member 76 of first carriage 48. The gearing within gear box 74 in turn is driven by an output shaft 78 a first motor 80. Motor may be electrically or pneumatically powered. It may also be a single or variable speed drive and, optionally, reversible depending on the groove cutting requirements of individual ones or certain lots of plastic pipes P.

Figure 3:
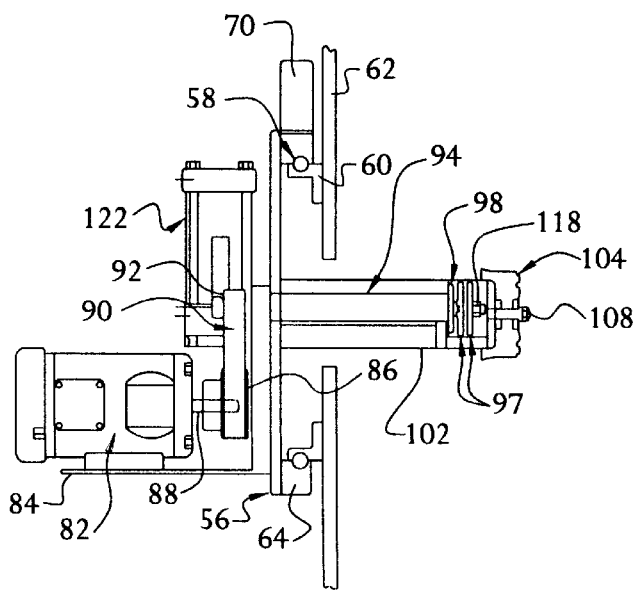
FIG. 3 is a further enlarged view of the pipe grooving equipment of the pipe machining system of FIG. 2.

As most clearly illustrated in FIG. 4, a second motor 82 is fastened to a crankshaft 84 which is pivotally attached to second carriage 56 via a bushing or bearing assembly 85. Like first motor 80, second motor 82 may be electric or pneumatic, single or variable speed and/or reversible as may be desired or necessary. A first pulley 86 is affixed to the output shaft 88 of second motor 82. As seen in FIGS. 3 and 4, an endless belt 90 is entrained about first pulley 86 and a second pulley 92. The second pulley 92 is affixed to one end of a shaft 94 which is rotatably supported within a suitable bushing or bearing assembly 95 attached to a block 96 carried by crankshaft 84, which crankshaft is offset relative to shaft 94.

Cutting tool means are affixed to the end of shaft 94 opposite pulley 92. The cutting tool means preferably comprise at least one or, more preferably, two or more circular rotary disk cutters 97 of the same or substantially similar diameter whose outer circumferential edges are provided with a plurality of knife-like or abrasive cutting means. Disk cutters 97 are of conventional design and will not be described in greater detail since their particular constructions do not, by themselves, constitute a novel part of the present invention. At least one groove depth limiting means 98 is provided adjacent the cutter(s) 97 to limit the cutting depth thereof within the interior wall of the bell shaped portion 100 of pipe P (FIG. 4). A presently preferred groove depth limiting means 98 is a rigid plastic or metal disk mounted for free rotation about shaft 94.

Referring to FIGS. 4 and 5, an elongate, rigid shroud member 102 is fixedly attached at a first end thereof to second carriage 56. A cylindrical, preferably metal, pilot member 104 is carried at the second end of shroud member 102. Relative rotation is enabled between the shroud member 102 and the pilot member 104 by virtue of a thrust-type bearing 106. More specifically, bearing 106 is affixed to the second end of shroud member 102 and receives a bolt or similar fastener 108 which passes through and is journalled within pilot member 104. Hence, when pilot member 104 is seated within pipe P in the manner illustrated in FIG. 4 and the second carriage 56 is caused to rotate by operation of first motor 80, the shroud member 102 and bearing 106 will rotate while pilot member 104 remains stationary. To assure firm seating of the pilot member 104 within pipe P, the pilot member preferably includes a frusto-conical portion 110 having a taper adapted to matingly seat against the interior wall of the tapered transition portion 112 of pipe P between the nominal diameter portion 114 of such pipe and the enlarged bell portion 100 thereof. In addition, pilot member 104 further preferably includes a substantially cylindrical portion 116 adapted for substantial mating insertion within the nominal diameter portion 114 of pipe P to further stabilize the cutting process. It will be appreciated that pilot member 104 may be easily replaced by a pilot member of different size and shape merely by removing fastener 108, removing pilot member 104, installing the new pilot member, and reinstalling fastener 108. Similarly, the cutters 97 and/or groove depth limiting means 98 may be replaced by removing a fastener 118 provided at the end of shaft 92, removing and replacing the desired cutters 97 and/or groove depth limiting means 98 and replacing the fastener 118.

As seen in FIG. 5, shroud member 102 is preferably about a one-half to three-quarter section channel including a slot-like opening 120 through which cutters 97 and groove depth limiting means 98 may be selectively projected to carry out a groove cutting procedure. To effectuate movement of the cutters 97 and groove depth limiting means into and out of opening 120, the pipe machining means further preferably comprises a third extendable and retractable drive means 122 (FIG. 4). Drive means 122 may be any of the types discussed herein and has a first end 124 affixed to second carriage 56 and a second end 126 pivotably attached to a crank arm 127 which is affixed to crankshaft 84. Preferably, drive means 122 is a single or double acting pneumatic piston and cylinder assembly connected to the same source of pressurized air as the first and second drive means 38 and 54. The first end 124 is the cylinder portion of drive means 122 and second end 126 is the piston portion thereof. When the second end 126 is extended, crankshaft 84 is turned through an arc sufficient to crank block 96 such that the cutters 97 and groove depth limiting means 98 project from opening 120 of shroud member 102 whereby they may contact the interior wall of the bell portion 100 of pipe P. When groove cutting is completed, the second end 126 of drive means 122 is retracted and crankshaft 84, block 97 and shaft 94 are turned through an arc sufficient to withdraw the cutters 97 and groove depth limiting means 98 into shroud member 102.

First carriage means 48 further preferably carries means 128 for drilling or boring the aforementioned flexible spline receiving hole through the wall of bell portion 100 of pipe P. Drilling means 128 comprise a third electric or pneumatic, single or variable speed and, possibly, reversible rotary motor 130 atop which is connected a fourth extendable and retractable, preferably pneumatic, drive means 132. Projecting outwardly from the housing of drive means 132 is a pair of upper and lower track follows members 134 (only one of which is shown in FIG. 2) which are supported by and slidingly or rollingly engage with a pair of horizontally oriented trackways 136 provided on a plate 138 affixed to first carriage 48. Also projecting from the housing of the drive means 132 is an internally threaded member 140 (FIG. 2) adapted to threadably receive a threaded rod 142. Rod 142 may be manually or mechanically rotated to cause lateral translation of the drilling means 128 (e.g., either left or right from the vantage point of FIG. 7) to accommodate pipes having bell portions of differing diameters. Extending upwardly from the piston of drive means 132 is a chuck 144 which is rotatably driven by motor 130 and releasably receives a drill bit 146 for drilling the tangential hole through the bell portion 100 of pipe P.

The operation of pipe machining apparatus 10 is as follows. Preferably, although not necessarily, some or all of the operation is controlled automatically by a central control device 147 such as a personal computer or the like having hardware and software appropriately configured for control of the various systems of the apparatus.

Initially, a pipe P is placed, either automatically or manually on table 12 with the bell shaped end 100 of the pipe facing the pipe machining and clamping systems 18. Depending on the length of the pipe, the appropriate push device 16 is activated to push the pipe toward the machining and clamping systems 18. The pipe is then pushed along table 12 a distance sufficient to dispose the leading end of the nominal diameter portion 114 of the pipe in vertical alignment with first and second jaws 44 and 46 of the pipe clamping means 22. The first drive means 38 are then activated to cause the movable first jaw 44 to engage an upper portion of the outer circumference of the nominal diameter portion 114 of pipe P and the stationary second jaw 46 to engage a lower portion of the outer circumference of the nominal diameter portion 114 of pipe P with firm yet nondestructive force sufficient to retain the pipe against movement, including rotation.

Thereafter, second drive means 54 is activated to move first carriage 48 toward pipe P until the pilot member 104 comes into firm seating engagement with pipe P. Third drive means 122 is then activated to cause cranking of shaft 84, block 96 and shaft 94 such that at least one of the cutters 97 projects through the opening 120 in shroud member 102 and contacts the interior wall of bell portion 100 of pipe P. Second motor 82 is then activated to cause rotation of the shaft 94 and cutter(s) 97 to begin the cutting process. Following this, the first motor 80 is activated to cause rotation of shaft 72, spur gear 70, ring gear 64 and second carriage 56 and all structure supported thereby including shroud member 102. To assure that cutter(s) 97 cut a complete annular groove in the bell portion 100 of pipe P, the first motor 80 is preferably operated so as to cause the second carriage 56 and its concomitant equipment, including cutter(s) 97, to travel through at least 360° or, more preferably, at least 370° of arc. The first and second motors 80, 82 are then deactivated. Thereafter, drilling means 128 are activated to cause bit 146 to drill a tangential hole through the wall of bell portion 100 if pipe P which cooperates with at least one groove formed by cutter(s) 97. Drilling means 128 are then deactivated and second drive means 54 is retracted to withdraw pilot member 104 from pipe P. First Drive means 38 is then retracted to release the clamping force from the pipe, and the pipe is discharged from table 12. When finished, the bell portion 100 of pipe P includes at least one or, more preferably, at least two annular grooves 148, 150 (FIGS. 4 and 9), one of which is adapted to cooperate with the tangential hole drilled by bit 146 so as to receive a flexible spline for connecting the pipe P with a correspondingly grooved male pipe P' (FIG. 9) to produce a bell and spigot connection. The other groove of grooves 148, 150 is also axially aligned so as to cooperate with the correspondingly grooved male pipe P' to receive an o-ring for sealing the bell and spigot connection against fluid leakage.

Figure 8:
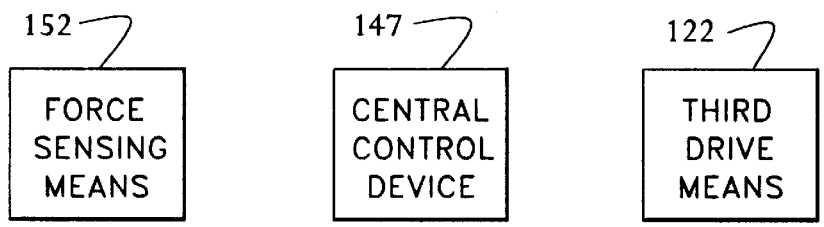
FIG. 8 is a schematic block diagram of a portion of the control system of the pipe machining apparatus of the present invention.

As indicated in FIG. 8, to assure that the cutters 97 cut grooves of uniform depth in the interior wall of the inherently oblate bell portion 100 of pipe P, the groove depth limiting means 98 is desirably electrically connected to a suitable strain gauge or similar force sensing means 152 disposed between the groove depth limiting means 98 and the shaft 94.

Accordingly, as the groove depth limiting means 98 traverses the interior wall of bell portion 100, its contact force is variable because of the eccentricity of the bell portion. In the event the detected contact force falls below a predetermined "low" threshold level, the sensing means 152 transmits this information to the central control device 147. The control device in turn, causes the third drive means 122 to substantially instantaneously extend an amount sufficient to reestablish the desired contact force between the groove depth limiting means 98 and the interior wall of bell portion 100. To prevent excessive wear of the force sensing means 152 should such means detect a contact force between the groove depth limiting means 98 and the interior wall of the bell portion 100 above a predetermined "high" threshold level, the sensing means transmits this information to the central control device 147. Responsive thereto, the control device 147 causes the third drive means 122 to substantially instantaneously retract an amount sufficient to relieve the excessive contact force yet maintain contact between the groove depth limiting means 98 and the interior wall of the bell portion.

Although not illustrated, apparatus 10 further preferably includes means for removing cutting chips or shavings which may contaminate the interior wall of the bell portion 100 and distort the accuracy of the data transmitted by the force sensing means 152. Such chip removing means preferably includes vacuum means disposed interiorly of shroud member 102. Optionally, and preferably, such means may also include anti-static means for removing static electrical charges form the cut chips which might otherwise cause them to adhere to the interior of bell portion 100.

Figure 9:
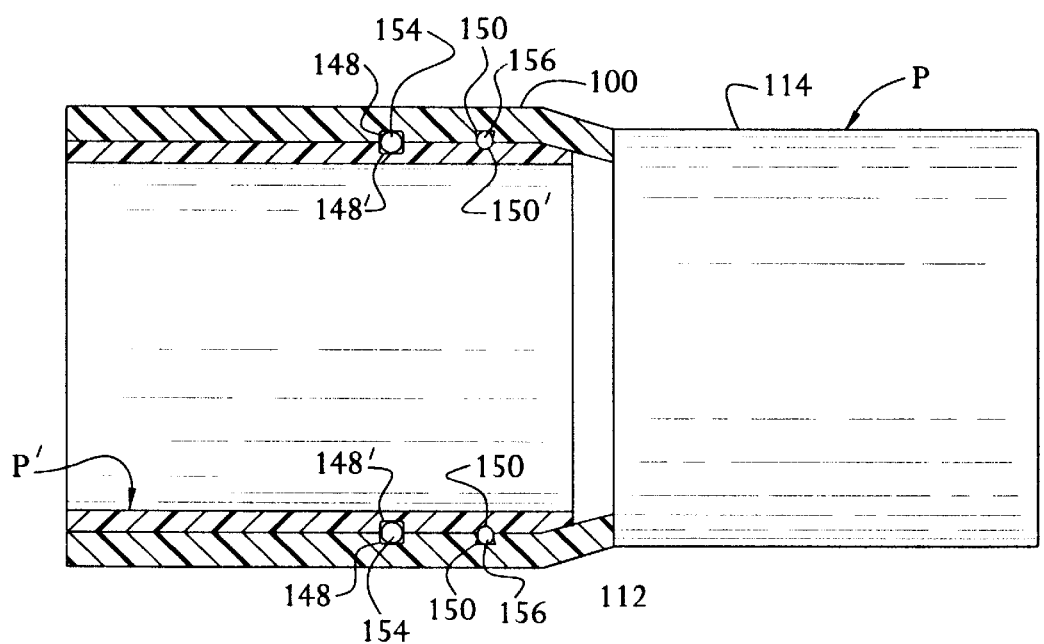
FIG. 9 is a bell and spigot pipe connection including a plastic pipe as machined by the pipe machining apparatus of the present invention.

FIG. 9 is an enlarged partial section view of a bell nd spigot pipe connection including a first plastic pipe P machined by the apparatus 10 according to the present invention.

Pipe P functions as the female pipe of the bell and spigot connection for receiving a male pipe P' having external annular grooves 148' and 150' which axially correspond to and cooperate with grooves 148 and 150, respectively, of pipe P. More specifically, grooves 148 and 148' cooperate to receive a flexible spline 154. Flexible spline 154 is inserted through an unillustrated aperture in the bell portion 100 that is drilled by bit 146 (FIG. 2) substantially tangentially to the annular channel formed by the cooperating grooves 148, 1481 so as to communicate with the channel. The flexible spline 154 is preferably made of a synthetic resinous material, such as polyethylene, polypropylene, polystyrene, PVC, nylon, polyamide, and the like. Although these materials are flexible, they are designed to resist compression under the typical working pressures of most fluid piping systems. Additionally, since the flexible spline 154 is preferably not elastomeric, the resulting mechanical lock will not become unjoined unless and until the spline is removed back through the aperture in the side wall of the bell portion 100 of pipe P. To facilitate removal, a small length of the spline 154 can be left outside of the bell portion so that it can be grasped and removed.

Optionally, a molten or flowable polymer can be injected through the tangential aperture and into the annular cavity formed by grooves 148, 148' and then solidified to form a permanent mechanical lock. And, prior to insertion of pipe P' in pipe P, a suitably sized o-ring 156 of natural or artificial rubber or similar material is placed in either groove 150 or 150' to establish a fluid-tight seal between the pipes upon assembly thereof.

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:

1. Apparatus for machining a plastic pipe having a bell portion, a nominal diameter portion and a tapered transition portion connecting said bell and nominal diameter portions, said apparatus comprising:

a clamp having jaws, the clamp having a drive that causes the jaws to engage said pipe so as to align said pipe and secure said pipe against movement;

a rotary cutter that cuts at least one annular groove in said interior wall of said bell portion;

a rotatable shaft that rotates said rotary cutter;

a rotating carriage, to which the rotary cutter is coupled, said rotating carriage causing said rotary cutter to traverse an interior wall of said bell portion and cut said at least one annular groove therein;

means for limiting the depth of said at least one circular annular groove cut by said rotary cutter means.

2. Apparatus for machining a plastic pipe having a bell portion, a nominal diameter portion and a tapered transition portion connecting said bell and nominal diameter portions, said apparatus comprising:

a clamp that clamps said pipe against movement;

a rotary cutter for cutting at least one annular groove in said interior wall of said bell portion;

a rotatable shaft that rotates said rotary cutter;

a rotating carriage, to which the rotary cutter is coupled, said rotating carriage causing said rotary cutter to traverse an interior wall of said bell portion and cut said at least one annular groove therein; and a disk coupled to the shaft for limiting the depth of said at least one circular annular groove cut by said rotary cutter means, said disk being concentric with the rotary cutter and having a smaller diameter than the rotary cutter.

3. The apparatus of claim 1, wherein the depth limiting means is a rotatable disk disposed adjacent said rotary cutter, for limiting the depth of said at least one circular annular groove cut by said rotary cutter.

4. The apparatus of claim 2, further comprising means for sensing the force exerted by said disk against said interior wall of said bell portion.

5. The apparatus of claim 2, further comprising means for moving said cutter means and said groove depth limiting means into contact with said interior wall of said bell portion.

6. The apparatus of claim 5 further comprising control means responsive to said sensing means for causing said moving means to maintain contact between said cutter means and said groove depth limiting means and said interior wall of said bell portion.

7. The apparatus of claim 2, further comprising means for establishing the axial position of said at least one annular groove from said tapered transition portion of said pipe.

8. Apparatus for machining a plastic pipe having a bell portion, a nominal diameter portion and a tapered transition portion connecting said bell and nominal diameter portions, said apparatus comprising:

a clamp that clamps said pipe against movement;

a rotary cutter for cutting at least one annular groove in said interior wall of said bell portion;

a rotatable shaft that rotates said rotary cutter;

a rotating carriage, to which the rotary cutter is coupled, said rotating carriage causing said rotary cutter means to traverse an interior wall of said bell portion and cut said at least one annular groove therein; and a pilot member connected to an end of the rotatable shaft, the pilot member having a taper that seats against the tapered transition portion, thereby establishing the axial position of said at least one annular groove.

9. The apparatus of claim 8, wherein said means for establishing the axial position of said at least one annular groove further comprise a second portion coextensive with said shaft and operable for substantial mating insertion within said nominal diameter portion of said pipe.

10. The apparatus of claim 9, further comprising means for limiting the depth of said at least one circular annular groove cut by said rotary cutter means.

11. The apparatus of claim 8, further comprising means for moving said cutter means and said groove depth limiting means into contact with said interior wall of said bell portion.

12. Apparatus for machining a plastic pipe having a bell portion, a nominal diameter portion and a tapered transition portion connecting said bell and nominal diameter portions, said apparatus comprising:

a clamp having jaws the clamp having a drive that causes the jaws to engage said pipe so as to align said pipe and secure said pipe against movement;

a rotary cutter that cuts at least one annular groove in said interior wall of said bell portion;

a rotatable shaft that rotates said rotary cutter;

a rotating carriage to which the rotary cutter is coupled, said rotating carriage causing said rotary cutter to traverse an interior wall of said bell portion and cut said at least one annular groove therein: and means for establishing the axial position of said at least one annular groove from said tapered transition portion of said pipe.

13. The apparatus of claim 1, further comprising means for sensing the force exerted by said depth limiting means against said interior wall of said bell portion.

14. The apparatus of claim 13 further comprising control means responsive to said sensing means for causing said carriage to maintain contact between said cutter and said groove depth limiting means and said interior wall of said bell portion.

15. The apparatus of claim 8 further comprising means for limiting the depth of said at least one circular annular groove cut by said rotary cutter means.

16. The apparatus of claim 15, further comprising means for sensing the force exerted by said depth limiting means against said interior wall of said bell portion.

17. The apparatus of claim 16 further comprising control means responsive to said sensing means for causing said carriage to maintain contact between said cutter and said groove depth limiting means and said interior wall of said bell portion.

18. Apparatus for machining a plastic pipe having a bell portion, a nominal diameter portion and a tapered transition portion connecting said bell and nominal diameter portions, said apparatus comprising:

a clamp having jaws, the clamp having a drive that causes the jaws to engage said pipe so as to align said pipe and secure said pipe against movement;

a rotary cutter that cuts at least one annular groove in said interior wall of said bell portion;

a rotatable shaft that rotates said rotary cutter;

a rotating carriage, to which the rotary cutter is coupled, said rotating carriage causing said rotary cutter to traverse an interior wall of said bell portion and cut said at least one annular groove therein;

a rotatable disk disposed adjacent said rotary cutter; and means for moving said cutter and said rotatable disk into contact with said interior wall of said bell portion.

* * * * *